(12) United States Patent
Lee

(10) Patent No.: US 6,186,824 B1
(45) Date of Patent: *Feb. 13, 2001

(54) BATTERY CLIP HAVING SIDEWALLS WITH AN INTEGRAL ELECTRICAL CONNECTION AND COUPLING CHANNELS

(75) Inventor: Keung Lee, Shatin (HK)

(73) Assignee: New Bright Industrial Co., Ltd., Kowloon (HK)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/165,799

(22) Filed: Oct. 2, 1998

Related U.S. Application Data

(60) Provisional application No. 60/080,547, filed on Apr. 3, 1998.

(51) Int. Cl.[7] .................................................. H01R 3/00
(52) U.S. Cl. ................................................... 439/500
(58) Field of Search .................................. 439/627, 626, 439/500, 698; 429/98, 99, 100; 320/112

(56) References Cited

U.S. PATENT DOCUMENTS

| | | | |
|---|---|---|---|
| 4,303,876 | * 12/1981 | Kelly et al. ............................. | 320/2 |
| 4,815,980 | * 3/1989 | Lauder et al. .......................... | 439/76 |
| 5,294,497 | * 3/1994 | Muramatsu et al. ................... | 429/97 |
| 5,576,911 | * 11/1996 | Porter ................................ | 360/98.06 |
| 5,607,322 | * 3/1997 | Schaub ................................ | 439/500 |
| 5,654,870 | * 8/1997 | Havener .............................. | 361/600 |
| 5,670,267 | * 9/1997 | Lee ........................................ | 429/9 |
| 5,748,454 | * 5/1998 | Nichols et al. ...................... | 361/814 |
| 5,935,729 | * 8/1999 | Mareno et al. ...................... | 429/100 |

OTHER PUBLICATIONS

TAMIYA Battery Pack (color images).–No Date.

* cited by examiner

*Primary Examiner*—Brian Sircus
*Assistant Examiner*—Chaudrika Prasad
(74) *Attorney, Agent, or Firm*—Nixon & Vanderhye P.C.

(57) ABSTRACT

A battery clip is disclosed that is formed from injected molded plastic and include metal contact inserts to provide electrical connections for batteries. The clip has an open-topped plastic container with receptacles for a plurality of batteries. The sidewalls of the containers have boss within gaps in the wall, and the boss fit into matching grooves in the underbelly of the toy or product to which the battery clip is mounted. The sidewalls have support ribs that provide rigidity to the clip, strengthen the cantilevered ends of the latches, and form guide rails for the batteries. In addition, the battery clip has recesses to receive stamped metal electrical connectors and that align the connectors with the terminal ends of batteries.

10 Claims, 3 Drawing Sheets

BATTERY CLIP HAVING SIDEWALLS WITH AN INTEGRAL ELECTRICAL CONNECTION AND COUPLING CHANNELS

This application claims benefit of Provisional No. 60/080,547 filed Apr. 3, 1998.

FIELD OF THE INVENTION

This invention relates to the field of removable battery clips, and in particular relates to battery clips for toys.

BACKGROUND AND SUMMARY OF THE INVENTION

Batteries are used to power many types of toys and other products. Batteries may be used to power motors that turn wheels of toy cars and other vehicles, and to power transmitters and receivers of remote controlled toys. They may be used to provide power to actuators in toys that, for example, turn wheels or other components of a toy. In addition, many other consumer products (and non-consumer products) require battery power. The power in the batteries will drain as the toy is operated. When the power provided by a battery or group of batteries becomes too low to drive the toy or product, then the batteries must be replaced. Because batteries must be replaced periodically, it is advantageous that they be easily removed and installed in a toy or other product.

Battery clips (which may also be referred to as packs) are one approach to facilitating the removal and installation of batteries. A battery clip is a container specifically adapted to hold batteries in electrical contact with a toy or other product to which the clip is mounted. The current invention relates to a novel and unobvious removable battery clip.

Battery clips perform several functions, including providing a holding container for one or more batteries. Usually, a battery clip will have internal battery mounts to receive a selected number of batteries. The clip should allow for easy removal and replacement of batteries.

One of the primary functions of a battery clip is to provide a safe container for batteries, especially when the batteries and clip are attached to a toy. Safety is a paramount concern in designing components for toys. A battery clip must be itself safe, and must hold a group of batteries in a safe manner. For example, the clip should be sturdy and have no small parts that are removable or that easily break off. In addition, the clip should not have sharp edges that might cut a child. The clip should also hold the batteries in a toy such that the batteries are secure, not exposed to children, and minimize risks of electrical shorts.

Another function of a battery clip is to provide an electrical path between the batteries and the toy or other device (collectively referred to as a toy) to which the clip is attached. To provide this electrical path, electrical conductors are included in the battery clip that electrically connect the batteries, and external electrical connectors on the clip. Usually, the batteries are electrically arranged in series in the clip, and the external connectors of the clip contact with terminals on the first and last battery in the series.

A third function of a battery clip is to be removably attached to a toy. The mounting of the battery clip to the toy or other device must reliably align the external connectors of the clip to corresponding electrical connectors within the toy. The mount that attaches the clip to the toy must provide sufficient structural support for the clip to securely fasten the clip and batteries to the toy, as the toy is operated and played with. A further feature of the mount for the battery clip is that it should be easy to remove and install on the toy, especially considering that children and other untrained consumers will be replacing batteries. Other desirable functions and features of a battery back are that it be durable, inexpensive and simple to manufacture, be unobtrusive when attached to a toy and compact. Another requirement of a battery clip is that it be rugged and should not break even when subjected to drops, knocks and other wear and tear associated with toys and consumer products.

The functions and features that are desirable for a battery clip are often inconsistent with one another. For example, to make the clip be compact and unobtrusive is often at odds with making the clip easy to use and durable. In addition, the need for a reliable, safe and secure attachment between the clip and toy is at odds with mounting that is easily removed. For example, some prior battery clips have included screws that attach the clip to the toy, but screws require a screw driver and are not easily used by children and many consumers.

Battery clip should be inexpensive to manufacture, especially for those clips used with toys. Toys are sold in a notoriously-competitive market. Low cost manufacture of toys is often a critical requirement for a commercially successful toy. Battery clips should be very low cost to maintain the necessary low cost of manufacturing the toy. The cost of manufacturing the battery clip for a toy should be no more than a few U.S. cents. Included in this manufacturing costs are the costs associated with the materials, e.g., plastic and metal, the cost of plastic injection molding to form the casing of the battery clip and to form a lid for the clip, the cost of the metal stamp process to form the conductors, the cost of inserting the conductors in the casing, the cost of labeling the clip, the cost of adding fasteners, e.g., screws, to be used to hold the clip together and to mount the clip to the toy, the cost of hand labor to assemble the clip, and other costs, e.g., capital, and overhead.

A novel and unobvious battery clip has been developed that has an open-topped plastic container with receptacles for a plurality of batteries. The sidewalls of the containers have slotted latches that fit into matching grooves in the underbelly of the toy or product to which the battery clip is mounted. The sidewalls have support ribs that provide rigidity to the clip, strengthen the cantilevered ends of the latches, and form guide rails for the batteries. In addition, the container has recesses to receive stamped metal electrical connectors and that align the connectors with the terminal ends of batteries. Furthermore, the container has apertures for selected metal connectors to provide an electrical connection between the batteries and the electrical components of the toy or other product to which the clip is mounted.

The battery clip of the present invention provides several advantages over the prior art, including an unusually large battery holding area relative to the overall size of the clip. In particular, the sidewalls of the clip are relatively thin and the battery holding area in clip fills substantially the entire area within the sidewalls. Because of the extra space provided by the present invention, additional batteries may be inserted or a better arrangement of batteries may be provided as compared to prior battery clips. Moreover, substantially the entire volume of the battery clip can be devoted to holding batteries. This is an especially desirable feature of the present invention because it allows clips to be smaller, and for larger batteries, e.g., rechargeable batteries, to be used in toys which previously received only smaller sized batteries. Another feature of the clip that reduces the area of the clip is that as many as possible of the protruding features, such as the attachments needed to secure the metal connectors in the case and the battery mounts, are formed on the bottom of the casing, rather than on the sidewalls. Often, the footprint of the clip, i.e., the area within the perimeter of the sidewalls, is to be limited or is restricted by the design of the toy. Toy design may allow for greater flexibility in the height of the clip. By arranging as many protruding feature of the clip, e.g., attachments for metal connectors and battery mounts, on the bottom of the clip and not on the sidewalls, the footprint of the clip can be minimized, while only slightly increasing the height of the clip.

Simplicity of design is another advantage provided by the present inventive battery clip. For example, the casing for the battery clip is an open rectangle having four straight sidewalls, and a flat bottom. The upper edges of the sidewalls are straight to match a flat recessed surface in the underbelly of the toy. The upper edges of an opposite pair of the sidewalls are slotted to form the latches (also referred to as bosses) that attach the clip to the toy. The latches are flush with the sidewalls, and do not protrude from the sidewalls which assists in minimizing the volume of the clip. Other than the slotted latches, the sidewalls have few structures other than several straight ribs that provide rigidity to the thin sidewalls and at least two apertures for metal contacts.

The bottom of the casing has a simple and minimalist design. The bottom has a pair of serrated ribs to align the batteries within the case, and an arrangement of metal contact holders. The metal contact holders are adjacent the sidewalls. Each metal contact holder includes a raised plastic bracket on the bottom of the casing. Each bracket includes a bar that covers one or more slots in the bottom of the casing, and a pair of legs between the bar and the corresponding sidewall. The bar and covered slots receive metal tabs of a metal connector and the legs assist in aligning the connector in the bracket. The metal connector is further held in the bracket by a plastic tab formed by slots in the sidewall adjacent the bracket. This simple arrangement to hold a metal contact of a bracket, covered slots and sidewall tabs can be readily formed with the case during the plastic injection molding process.

Other advantages provided by the invention are safety and low cost of manufacture. The battery clip is safe because it is a single piece with no small removable components that might be swallowed by a child. In addition, the small components of the clip, e.g., bosses and metal connectors, are not removable and are specially designed to prevent removal or breakage. In addition, the casing for the battery clip is formed as one component using standard plastic injection molding techniques. The slotted latches, ribs and tabs of the sidewalls, and the brackets with covered slots in the floor of the casing are formed in a single split mold. In addition, the metal contacts may be made using standard metal stamping and bending processes. Moreover, the metal contacts can be mechanically inserted and snapped into place in the floor of the casing. Accordingly, the clip is safe and its manufacture is suited to low-cost manufacturing techniques.

DETAILED DESCRIPTION OF THE DRAWINGS

Figure 1:
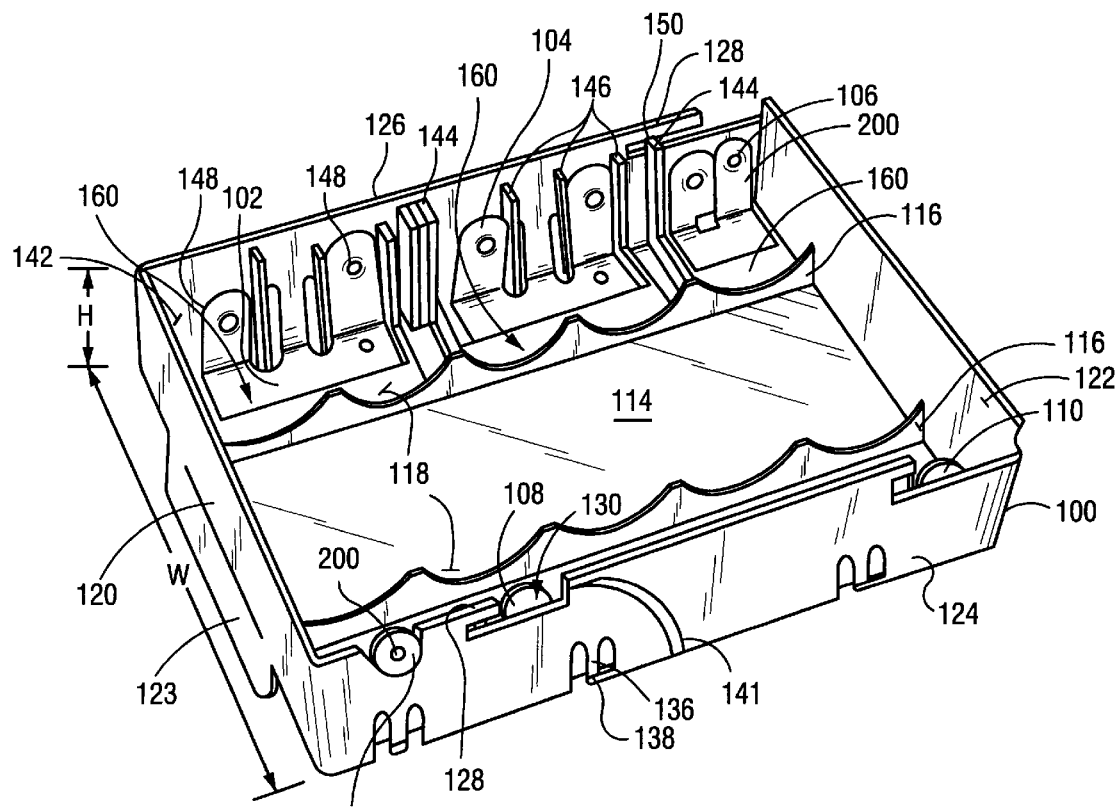
FIG. 1 is a perspective view of a battery clip which embodies the present invention.

FIG. 1 shows a battery clip 100 formed of molded plastic and metal contact inserts 102, 104, 106, 108 and 110. An advantage of the battery clip is that it may be formed from a single mold in an injection molding process, except for the metal connectors. The clip has a generally rectangular box shape with a open top. There are four walls 120, 122, 124, and 126, and a bottom panel 114. The width (W) of the battery clip is preferably only slightly greater than the length of one of the batteries to fit in the clip. The length (L) of the battery clip is preferably only slightly longer than the combined diameter (or width) of all of the batteries to fit in the clip.

To provide nests for the individual batteries (not shown) a pair of battery receiving serrated ribs 116 extend the length of the clip 100 along the bottom panel 114. The ribs run parallel to one other and have half-moon nests 118 for each battery. The nests 118 in the pair of ribs are aligned so to that the batteries are arranged in a row across the width of the clip. The height (H) of the clip is slightly greater than the top edge of the row of batteries when nested in the ribs 116.

The front 120 and rear 122 walls of the clip are generally planer and continuous. The front wall may include a lip 123 on the bottom panel 114, which lip provides a finger hold to assist with the insertion and removal of the battery clip from a toy. The ends of the ribs 116 for the battery clip terminate at the sidewalls. It is preferable for injection molding ease, if an apex of the rib terminates at the wall.

Figure 2:
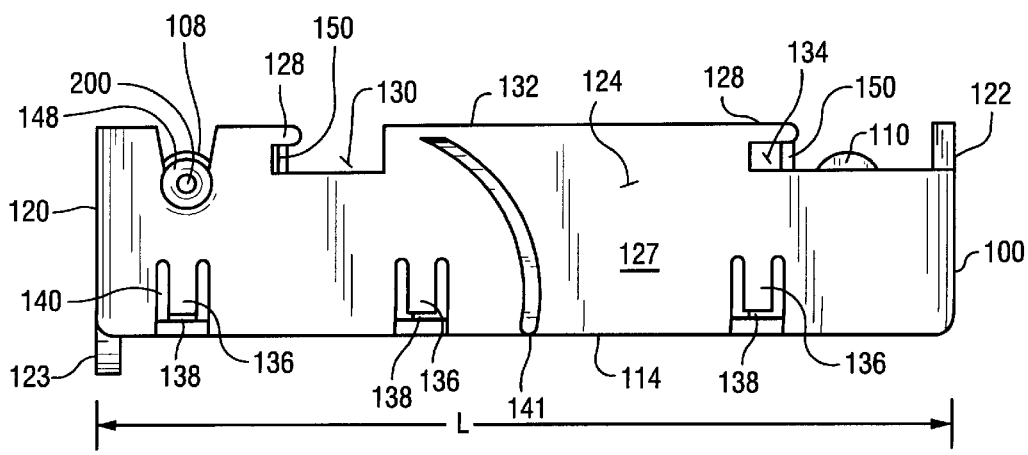
FIG. 2 is a side view of the battery clip shown in FIG. 1.
Figure 4:
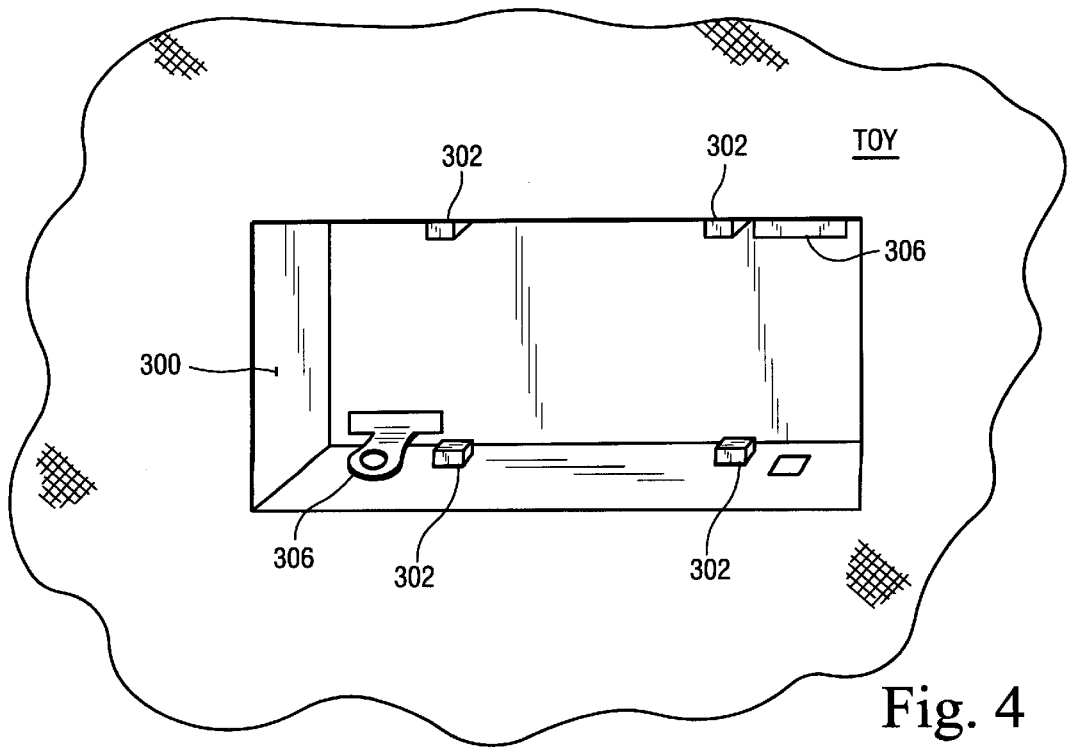
FIG. 4 is a perspective view of a battery clip receptacle in a toy suitable for engaging the battery clip shown in FIG. 1.

The left and right sidewalls 124, 126 of the battery clip are also generally planer, as are the front and rear walls. The sidewalls have several features to assist in attaching the clip to a toy, to hold the metal connectors in the clip and to provide an opening through which metal terminals in the toy can contact certain metal end terminal connectors 200 in the clip. As seen in FIG. 2 the outside surface 127 of the sidewall 124 includes bosses 128 (also referred to as latches) that engage support posts (302 in FIG. 4) in a recessed battery clip receptacle 300 in the underside of a toy. The bosses in the battery clip are formed integrally as part of the sidewall 124 during the molding process by forming a near-rectangular gap 130 in the top edge 132 of the wall. The boss 128 overhangs a channel portion 134 of the gap. The portion of the gap that the boss does not overhang allows a support post 302 of the toy to enter the gap and slide into the channel 134 in the wall 124 that is below the boss. There may be two boss/gap 128, 130 arrangements on each sidewall so as to engage four support posts in the toy or two such arrangements on one side and one arrangement on the other. The boss/gap arrangements may also be incorporated into the front and back wall of the clip, as an alternative to having them in the sidewalls.

The outside surface 127 of the sidewalls also has vertical plastic tabs 136 which hold down a corresponding metal tab 138 of the metal connectors. The plastic tabs 136 are integral with the sidewall and form as part of the plastic in the sidewall. The tabs 136 are formed by molding a U-shaped slot 140 in the sidewall. The bottom of the slot is at the bottom edge of the sidewall, and the slot extends up along either side of the tab 136 in the sidewall. The tabs in the sidewall extend downward, and normal to the metal tabs 138 of the metal connectors, so that the metal tabs are pressed downward or against the bottom panel 114 of the clip 100. There should be at least one plastic tab 136 for each of the metal connectors in the battery clip. Moreover the outside surface of the sidewalls includes a quarter-circle ridge 141 which facilitate the insertion of the clip into a toy. In addition, the ridge 141 fills in any small gap that might exist between the battery clip and the sidewalls of a battery recess 300 in a toy. By filling in gaps between the clip and sidewalls of the battery recess, the ridge 141 further serves a safety function of preventing small metal wires from working their way through gaps between a battery clip and the sidewalls of the battery recess and then to the batteries where a short circuit may occur. The ridge 141 may not be necessary if the sidewalls of the clip are sufficiently thick so as to prevent any gap between the clip and the sidewall of the battery recess in the toy.

The inside surface 142 of the sidewalls includes several vertical support ribs 144, 146 to provide rigidity to the sidewalls and to provide a support for the terminal ends of the batteries. Some of the ribs 144 are relatively thick and wide to provide rigidity to the clip. These ribs are usually not immediately adjacent a metal contact terminal 148 as they might hold the end of the battery too far away from the connector to provide good contact. A narrower rib 146 is preferably placed on either side of the metal contact terminal 148 to assist in aligning the battery terminal against the metal contact and to prevent the battery terminal from depressing the metal contact directly against the sidewall.

The ribs are arranged to ensure that the batteries are safely inserted in the clip and in the proper orientation. For example, the ribs 144, 146, should be arranged such that good electrical connections between the batteries and the metal contacts 102, 104, 106, 108 and 110, occurs only when the batteries are properly inserted in the clip. If the batteries are inadvertently inserted backwards into the clip, then the ribs 146 may prevent good electrical contact from occurring between the metal contacts and the batteries, and may prevent the batteries from being fully inserted in the clip. In addition, the thicker ribs 144 keep the batteries aligned in the clip and thus provide a further safety function of preventing short circuits that might occur if the batteries become skewed in the clip.

The ribs also bridge the gap 130 in the sidewall to provide support against the inside surface of each boss 128. The bosses would tend to break off, if the ribs did not support them. By reducing the risk of breakage of small parts from the bosses, the safety of the clip is improved. The ribs do not interfere with the support posts 302 in the toy, because the ribs are set back from the plane of the sidewalls 124, 126 sufficiently that the ribs do not contact the posts.

Figure 3:
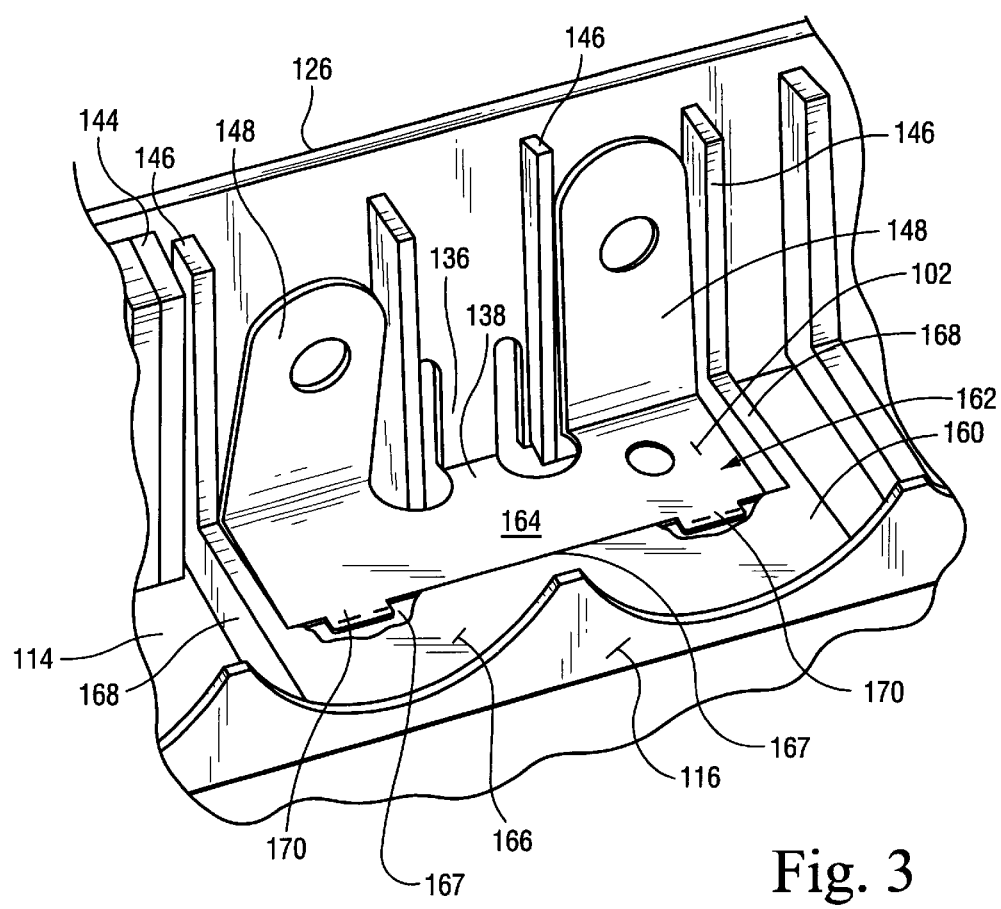
FIG. 3 is a perspective view of a segment of the clip having a metal battery contact insert to the battery clip shown in FIG. 1.

The bottom panel 114 of the battery clip includes a raised plastic border 160 which is best shown in FIG. 3. The raised plastic border is formed on the inside surface of the bottom panel and during the injection molding process of the clip. The border forms a well 162, also referred to as a recess and receptacle, to hold each of the metal contact inserts 102, 104, 106, 108 and 110. The plastic border of each web includes a raised front block 166 on the bottom panel that is adjacent the battery receiving rib 116 and faces towards the sidewall of the clip. The front edge 167 of the block 166 is straight, but is shown in FIG. 3 as broken away to illustrate the tabs on the metal contacts. A pair of raised side-blocks 168 extend along the bottom panel from the front block to the sidewall. A well 162 is defined by the inside surfaces of the front and sidewall blocks for each of the raised plastic borders.

The metal contact inserts 102, 104, 106, 108 and 110, each include a metal foot 164, that forms a connecting bridge between a pair of battery contact terminal fingers 148, or a battery contact terminal finger 148 and an end contact terminal finger 200. The foot 164 of each insert fits in the well of the plastic border of the bottom panel of the battery clip. In addition, there are tabs 170 at the front edge of the foot which extend underneath the front block 166. These tabs extend into slots 172 under the front block.

Figure 5:
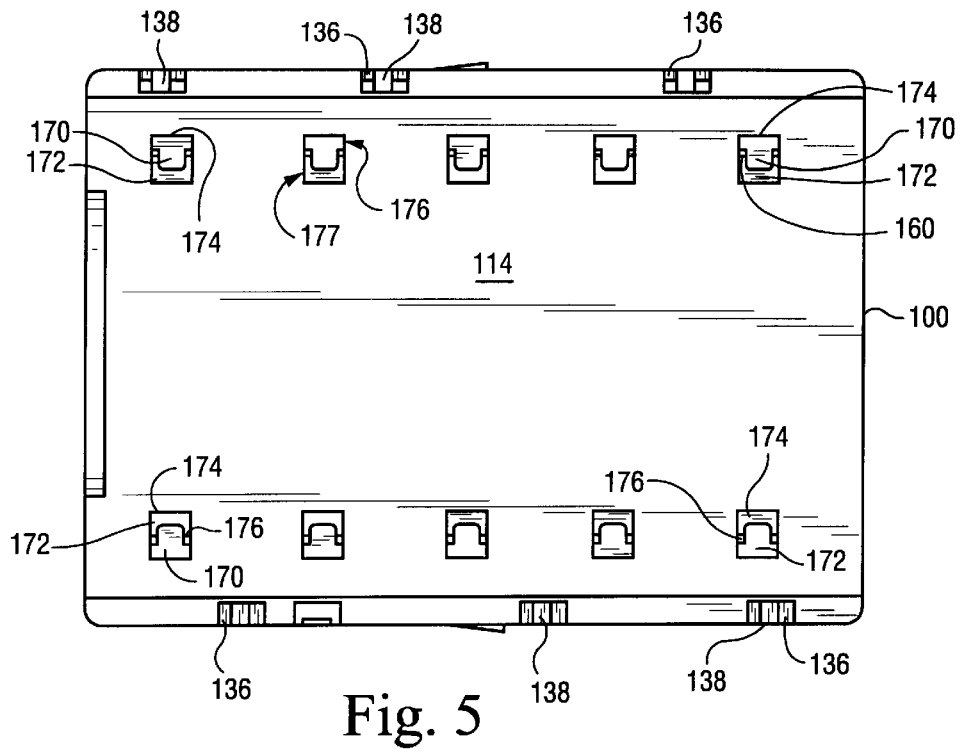
FIG. 5 is a bottom view of the battery clip shown in FIG. 1.

As shown in FIG. 5, the slots 172 in the bottom panel 114 of the clip are formed during a plastic injection molding process. An array of small, square recesses 174 are formed in the outer surface of the bottom panel during the molding process. These recesses 174 are formed partially, but not entirely, underneath the front block 166 of the plastic border 160 (see FIG. 3). The block overlaps the recess to form the slot 172. For example, the front edge 167 of the front block 166 crosses the center of the recess, so that when the recesses are viewed from the bottom of the clip a hole 176 through the bottom panel is visible and a portion 177 of the bottom of the front block 166 of border 160 is also visible. Because of these recesses and the front block, slots 172 are formed in the bottom panel 114 and under the blocks during the molding process. The metal tabs 170 on the metal connectors slide into and are held by these slots 172 to secure the metal contact inserts in the battery clip.

The metal contact inserts each have the metal foot 164 with front tabs 170 and rear tabs 138. In addition, the inserts have the upright finger contact terminals 148 that provide an electrical connection to a battery terminal. The metal contact inserts that provide an electrical connection external to the clip are end terminals 200. For those contact inserts that have raised end external terminal connectors 200 that provide an electrical connection to a metal contact 306 in the toy. The end terminals have outwardly extending protrusions that extend through the sidewalls of the clip to provide a connection with the metal contact 306 of the toy. The sidewalls of the clip may have an aperture through which the end terminal extends or have a slot in the top edge of the sidewall, such as is shown in FIG. 1, to receive the end terminal. The metal contact inserts that do not serve as end terminals, include two contact terminals 148 with raised contacts 149 to provide a series electrical connection from one terminal end of a battery to a terminal end of another. The metal contact inserts are arranged in the bottom panel of the battery clip to provide a series electrical connection for all of the batteries and the end terminals of the battery clip.

Figure 6:
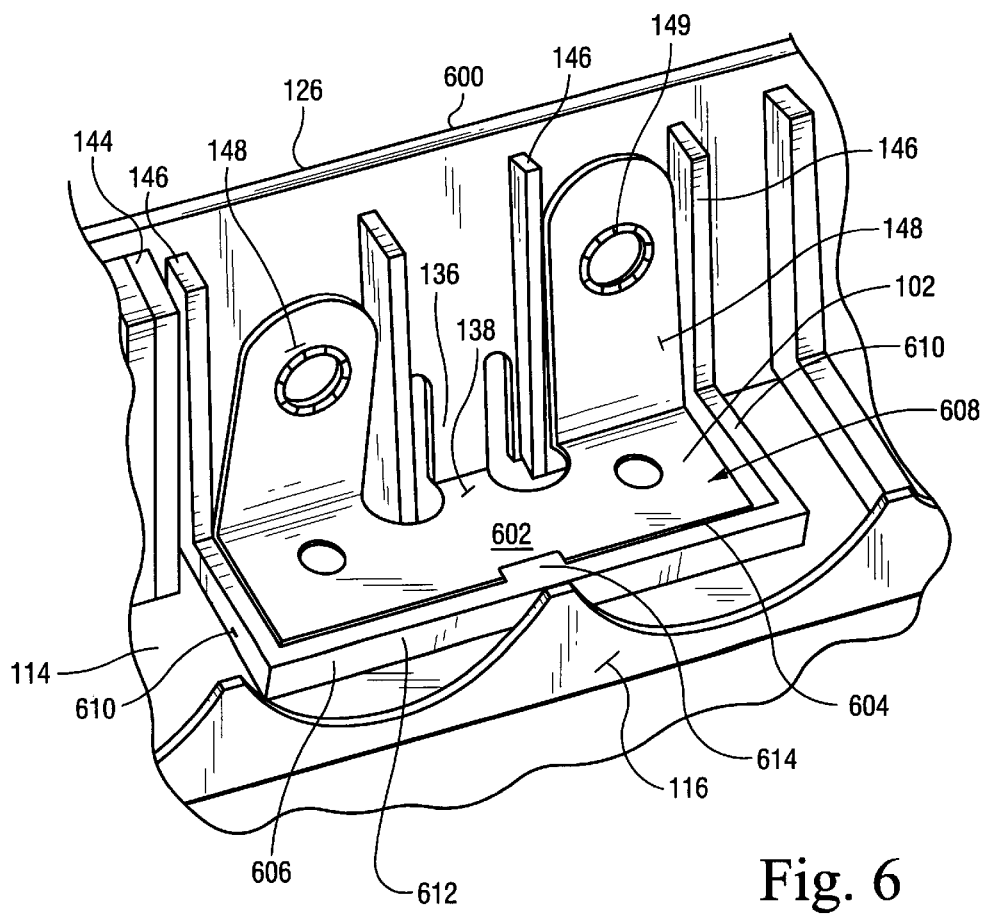
FIG. 6 is a perspective view of a second embodiment of a battery clip having a metal battery contact insert to the battery clip.

FIG. 6 shows a portion of a second embodiment of the battery clip 600 having a modified metal contact 602. The portions of the second embodiment that are the same as the first embodiment are numbered the same as in FIGS. 1 to 5. The metal contact 602 of the second embodiment has a simplified front edge 604 that is straight. The metal contact 602 does not have the front tabs of the metal contacts used in the first embodiment. However, the metal contacts of both the first and second embodiments have rear tabs 138. In the second embodiment 600, the bottom panel 114 has a fence 606 surrounding the foot 608 of the metal contact. The fence is a short ridge formed during the molding process on the bottom panel. The fence has two short walls 610 aligned with the ribs 146 on the sidewall 126 of the clip, and a long front wall 612 that extends between the two short walls. The front wall 612 has a lip 614 that overhangs the bottom panel 114 of the clip such that the front edge 604 of the foot of the metal contact can slide under the lip as the rear metal tab 138 snaps in place under the plastic tab 136 in the sidewall of the clip. The overhang of the lip 614 is formed during the molding process by having a mold insert that forms an opening in the bottom panel 114 and the insert extends slightly through the bottom panel so as to terminate the bottom of the lip 614 above the top surface of the bottom panel.

The invention has been described in terms of its best mode. The invention is not limited to the disclosed embodiment. The invention covers various modifications and equivalent arrangements included within the spirit and scope of the following claims.

What is claimed is:

1. A battery clip comprising:

a battery container having an open top, a bottom panel and four sidewalls, wherein two opposite sidewalls each have a top edge with a gap and a boss that partially overlaps the gap to form a channel below the boss, and a top edge of the boss is in a line with the top edge of the sidewall with the gap, the bottom panel including receptacles for one or more batteries and slots for mounting electrical connectors, said electrical connectors each include a planer bridge, a battery contact terminal finger and a external contact terminal finger, said planer bridge being adjacent the bottom panel and said bridge including a front edge extending into one of said slots of the bottom panel and a rear edge extending underneath a tab of a sidewall;

said battery contact terminal finger extending from said bridge and along said sidewall, and having a battery terminal contact; and said external contact terminal finger extending from said bridge and along said sidewall, and having an external terminal contact extending at least partially through said sidewall.

2. A battery clip as in claim 1 further comprising a rib along an inside surface of one of the two opposite sidewalls, and the rib extending from the boss, across the channel and towards the bottom panel.

3. A battery clip as in claim 2, wherein the rib includes a rib for each boss in the clip.

4. A battery clip as in claim 1 wherein the rib and boss are formed of injected molded plastic.

5. A battery clip comprising:

a battery container having an open top, a bottom panel and a plurality of sidewalls, wherein the bottom panel has at least one recess to receive a tab of a bridge of a metal connector and the recess is adjacent at least one of the sidewalls, and the bottom panel having receptacles for one or more batteries;

the metal connector has a battery contact terminal finger and an external contact terminal finger which both extend upright from the bridge, and said tab extending outward from the bridge of the connector, wherein the tab of the bridge engages a tab of a sidewall, and the tab of the bridge is substantially normal to the tab of the sidewall, wherein said external contact terminal finger includes an external electrical terminal contact extending at least partially through said sidewall, and said battery contact terminal finger includes a battery terminal contact.

6. A battery clip as in claim 5, wherein the bridge of the metal connector includes another tab on a side of the bridge opposite to the sidewall, and said another tab extends into a slot of a well in the bottom panel.

7. A battery clip as in claim 6, wherein the slot is formed by an aperture in the well of the bottom panel which is only partially covered by a raised plastic segment on an inside surface of the bottom panel.

8. A battery connector mounted in a battery clip having at least one sidewall and a bottom panel, said connector comprising:

a battery contact terminal finger extending up from the bottom panel and along an interior surface of the sidewall, said battery contact terminal finger including an electrical battery contact for a battery terminal;

an external contact terminal finger extending up from the bottom panel and along the interior surface of the sidewall, said external contact terminal finger including external terminal contact extending at least partially through said sidewall and providing a disconnecting electrical connection to a device external to the battery clip, and a connecting bridge extending between the external contact terminal finger and the battery contact terminal finger and being positioned adjacent the bottom panel, said bridge being integral with said battery contact terminal finger and said external contact terminal finger, wherein said connecting bridge provides an electrical connection between the electrical battery contact and the electrical external terminal contact.

9. A battery connector as in claim 8 wherein said battery contact terminal finger, said external contact terminal finger and said connecting bridge are formed of a single metal sheet.

10. A battery connector as in claim 8 wherein said connecting bridge is positioned in a well of the bottom panel and further includes a front tab to engage a slot in the well of the bottom panel, and a rear tab to engage a tab on the sidewall.

* * * * *